United States Patent
Fode et al.

(10) Patent No.: US 8,655,991 B2
(45) Date of Patent: Feb. 18, 2014

(54) AUTOMATED RAPID REGISTRATION OF APPLICATIONS

(75) Inventors: Wade S. Fode, Byron, MN (US); Kevin W. Kirkeby, Rochester, MN (US); Kevin G. Paterson, San Antonio, TX (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 12/578,674

(22) Filed: Oct. 14, 2009

(65) Prior Publication Data

US 2011/0087760 A1 Apr. 14, 2011

(51) Int. Cl.
*G06F 15/173* (2006.01)

(52) U.S. Cl.
USPC .......................................................... 709/221

(58) Field of Classification Search
USPC ........................................... 709/220, 221, 223
See application file for complete search history.

(56) References Cited

U.S. PATENT DOCUMENTS

| | | | | |
|---|---|---|---|---|
| 6,128,657 A | * | 10/2000 | Okanoya et al. | 709/224 |
| 6,311,190 B1 | * | 10/2001 | Bayer et al. | 1/1 |
| 7,275,150 B2 | * | 9/2007 | Pagan | 713/1 |
| 2005/0076246 A1 | * | 4/2005 | Singhal | 713/201 |

* cited by examiner

*Primary Examiner* — Scott Christensen
(74) *Attorney, Agent, or Firm* — Patterson & Sheridan LLP (57) ABSTRACT

A method and apparatus for managing distribution and use of software applications. An application manager at an administrator computer may be configured to receive requests for registering an application from a client computer. The application manager may determine whether the request should be approved based on historical responses to similar registration requests. A response to the request may accordingly be sent automatically to the requesting client computer.

18 Claims, 6 Drawing Sheets

FIG. 1

```
                                        ┌─ 200
APPLICATION REGISTRATION

PLEASE ENTER THE FOLLOWING DATA
TO REGISTER THE APPLICATION

FIRST NAME   [          ]──210
LAST NAME    [          ]──220
DEPARTMENT   [ACCOUNTING ▼]──230

REQUESTED        ☐ EMAIL
FEATURES:   240  ☐ CHAT
                 ☐ INSTANT MESSAGING
                 ☐ FILE SHARING

250 ─ [SUBMIT]
```

AUTOMATED RAPID REGISTRATION OF APPLICATIONS

BACKGROUND OF THE INVENTION

1. Field of the Invention

The present invention generally relates to computer systems, and more specifically to managing distribution and use of software applications.

2. Description of the Related Art

Modern business organizations increasingly depend on computer systems to facilitate performing day to day functions. For example, computer systems are used for sales, data management, networking and communication, accounting, product development and design, and a wide variety of other functions. Generally, software products may be installed on the computer systems to facilitate performing one or more of the functions. For example, an email client software product may be installed in a computer to allow employees of the organization to communicate via email.

In some cases, a user that installs a software product in a computer will be prompted to register an account prior to using the software. A system administrator may receive account registration information and authorize users to use installed software. The registration of user accounts may be necessary to restrict access of software products to authorized individuals within an organization.

SUMMARY OF THE INVENTION

The present invention generally relates to computer systems, and more specifically to managing distribution and use of software applications.

One embodiment of the invention provides a computer-implemented method for registering applications residing on one or more client computers. The method generally comprises configuring one or more computer processors to perform an operation comprising receiving a request to register an application from a client computer, and determining whether there is sufficient historical data comprising responses to previously received requests similar to the request to determine a response for the request to register the application. The method further comprises determining whether the request for registering the application should be approved or rejected based on the historical data upon determining that there is sufficient historical data.

Another embodiment of the invention provides a computer readable storage medium comprising a program product which, when executed, performs an operation for registering applications residing on one or more client computers. The operation generally comprises receiving a request to register an application from a client computer, and determining whether there is sufficient historical data comprising responses to previously received requests similar to the request to determine a response for the request to register the application. The operation further comprises determining whether the request for registering the application should be approved or rejected based on the historical data upon determining that there is sufficient historical data.

Yet another embodiment of the invention provides a system comprising a plurality of client computers, wherein each client computer is configured to generate a request to register one or more applications and at least one administrator computer comprising a memory comprising a program and a processor. The processor, when executing the program is generally configured to receive a request to register an application from at least one client computer, determine whether there is sufficient historical data comprising responses to previously received requests similar to the request to determine a response for the request to register the application, and upon determining that there is sufficient historical data, determine whether the request for registering the application should be approved or rejected based on the historical data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention generally relate to computer systems, and more specifically to managing distribution and use of software applications. An application manager at an administrator computer may be configured to receive requests for registering an application from a client computer. The application manager may determine whether the request should be approved based on historical responses to similar registration requests. A response to the request may accordingly be sent automatically to the requesting client computer.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD- ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
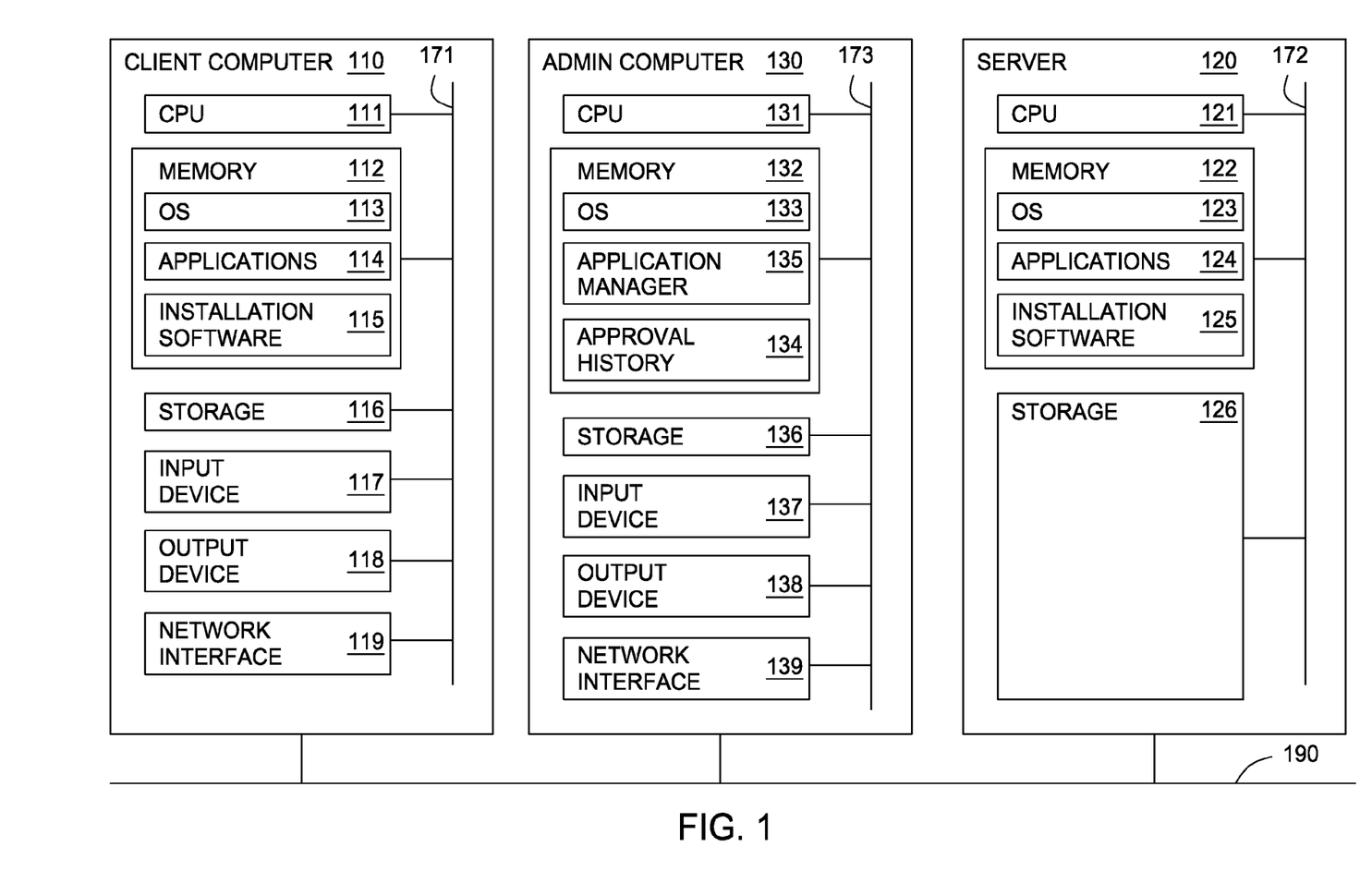
FIG. 1 illustrates an exemplary system according to an embodiment of the invention.

FIG. 1 depicts a block diagram of a networked system 100 according to an embodiment of the invention. In general, the networked system 100 includes a client (e.g., user's) computer 110, a server 120, and an administrator's (admin) computer 130. The client computer 110, admin computer 130, and server 120 may be connected via a network 190. In general, the network 190 may be a local area network (LAN), a metropolitan area network (MAN), a wide area network (WAN), or the like. In a particular embodiment, the network 190 is the Internet.

The client computer 110 may include a Central Processing Unit (CPU) 111 connected via a bus 171 to a memory 112, storage 116, an input device 117, an output device 118, and a network interface device 119. The input device 117 can be any device to give input to the client computer 110. For example, a keyboard, keypad, light-pen, touch-screen, trackball, or speech recognition unit, audio/video player, and the like could be used.

The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 110 and admin computer 130 or server 120 via the network 190. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Exemplary operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 may also include one or more applications 114. Applications 114 may be software products comprising a plurality of instructions which, when executed by the CPU 111 are capable of performing operations requested by a user of the client computer 110. The operations may involve, for example, retrieving, manipulating, displaying, and/or storing data. For example, in one embodiment, the applications 114 may include a query program configured to create and issue queries against a database to retrieve data therefrom.

In one embodiment of the invention, the applications 114 may be installed in the client computer 110 by installation software 115 illustrated in memory 112. The installation software 115, when executed by the CPU 111, may be configured to perform one or more operations to enable the client computer 110 to execute an application 114. For example, the installation software 115 may be configured to unpack compressed application files, install device drivers, create one or more directories and folders, place dynamic link libraries (DLLs) associated with the application 114 in a predefined folder, and the like.

In one embodiment of the invention, the installation software 115 may be configured to register a user account for a user of the client computer 110 so that the user may access and use an application 114. The operations performed by the installation software 115 to register a user account are described in greater detail below.

The admin computer 130 may be physically arranged in a manner similar to the client computer 110. Accordingly, the admin computer 130 is shown including at least a CPU 131, memory 132, storage device 136, input device 137, output device 138, and a network interface device 139 coupled with one another by a bus 173. The memory 132 may include an operating system 133. Illustrative operating systems 132, which may be used to advantage, include Linux (Linux is a trademark of Linus Torvalds in the US, other countries, or both) and Microsoft's Windows®. More generally, any operating system supporting the functions disclosed herein may be used.

Memory 132 may also include an application manager program 135. The application manager 135 may be a software product configured to approve the use of applications 114 by a user at the client computer 110. For example, the application manager 135 may be configured to receive registration requests from installation software 115 and either approve or reject use of an application 114 at the client computer based on one or more predefined criteria, as is discussed below. In one embodiment of the invention, whether a registration request should approved or rejected may be determined by the application manager 135 based on historical approval of similar registration requests stored in the approval history 134, as is described in greater detail below.

The server 120 may include at least one CPU 121, memory 122, and a storage device 126, coupled with one another by a bus 172. Memory 122 may be a random access memory sufficiently large to hold the necessary programming and data structures that are located on server 120. The server 120 may generally be under the control of an operating system 123 shown residing in memory 122. Examples of the operating system 123 include IBM OS/400®, UNIX, Microsoft Windows®, and the like. More generally, any operating system capable of supporting the functions described herein may be used.

The memory 122 further includes one or more applications 124. The applications 124 may be software products comprising a plurality of instructions that are resident at various times in various memory and storage devices in the computer system 100. In one embodiment of the invention, the applications 124 may correspond to the applications 114 at the client computer 110. For example, the client computer 110 may be configured to retrieve the applications 124 from the server 120 via the network 190 and store the applications locally as the applications 114. In one embodiment of the invention, the applications 124 may be in a compressed format. Therefore, the installation software 115 may be configured to decompress the application 124 prior to storing the application as an application 114 on the client computer 110.

In another embodiment of the invention, the applications 124 at the server 120 may be configured to operate in conjunction with the applications 114 at the client computer 110. For example, as described above, the client computer may include a web browser (an example of an application 114) capable of generating registration requests for web content. In one embodiment, the server 120 may be a web server, and an application 124 of the server 120 may be configured to receive the registration requests for web content from the web browser 114 and provide the requested web content to the client computer 110.

The memory 125 may also include installation software 125. The installation software 125 may correspond to the installation software 115 of the client computer 110. In one embodiment of the invention, the client computer 110 may be configured to retrieve the installation software 125 from the server 120 and store it locally as the installation software 115. Thereafter, the installation software 115 may be executed at the client computer 110 to install and register use of an application 114 at the client computer 110.

Storage 126 is also preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 122 and storage 126 could be part of one virtual address space spanning multiple primary and secondary storage devices. In one embodiment of the invention, the applications 124 may be configured to access and modify the data stored in the storage device 126 in response to receiving registration requests from the applications 114 of the client computer 110.

In one embodiment of the invention the system 100 may include a plurality of client computers 110. For example, the system 100 may be implemented by a large organization. The organization's employees, customers, partners, and the like (referred to hereinafter as users) may access the system 100 via the client computers 110 to perform one or more functions associated with their respective roles. In one embodiment of the invention, the particular applications 114 available to users may be limited based on a variety of factors such as, for example, the user's role. As an example, the customers of the organization may not have access to the same applications 114 as the organization's employees.

Accordingly, when an application 114 is installed in the client computer 110 the user may be prompted to register a user account with an administrator prior to using the application 114. For example, in one embodiment a user at the client computer 110 may download a new application 114 and associated installation software 115 on to the client computer 110 for example, from a server 120. The user may then execute the installation software 115.

The installation software 115 may perform one or more functions to prepare the client computer 115 to execute the application 114. For example, the installation software may create folders, install drivers, place DLLs in predefined folders, and the like, as described above. In one embodiment of the invention, the installation software may collect data regarding the hardware and/or software at the client computer 110. Exemplary hardware and software data collected may include available memory, processor speed, operating system type, and the like.

In one embodiment of the invention, the installation program 115 may be configured to retrieve data regarding the user installing the application 114 at the client computer 110. For example, the application program 114 may display a GUI screen configured to receive data regarding the user. The user data may include, for example, the user's role with respect to the organization, the department in which the user works, and the like.

Figure 2:
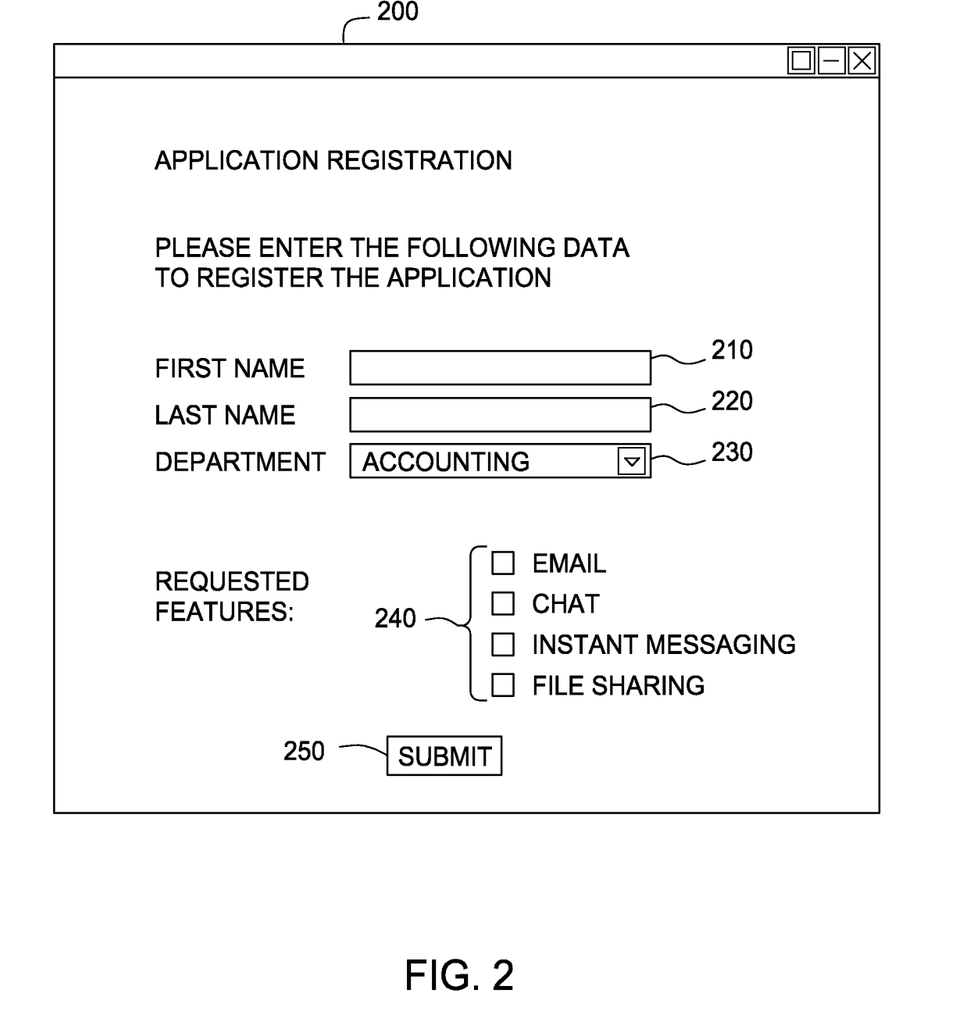
FIGS. 2-6 illustrates an exemplary GUI screens according to an embodiment of the invention.

FIG. 2 illustrates an exemplary GUI screen 200 that may be displayed by the installation software 115. The GUI 200 may include a plurality of data input tools such as text boxes, drop down menus, radio buttons, check boxes or the like to facilitate data input by a user. For example, a user may enter their first and last names in the text boxes 210 and 220, select a department using drop down menu 230, and select specific desired applications using the checkboxes 240 in GUI 200.

Embodiments of the invention are not limited to the particular types of requested data illustrated in FIG. 2. In alternative embodiments, a user may be prompted for any reasonable type of relevant user data, for example, employee or customer ID, phone number, email addresses, locations, and the like.

After a user has completed entering the data requested in the GUI 200, the user may click the submit button 250. In one embodiment of the invention, clicking the submit button 250 may result in a registration request being sent from the client computer 110 to an admin computer 130 via the network 190. In one embodiment of the invention, the installation software 115 may not complete installation of an application until an approval for installation is received from the admin computer 130. Accordingly, in some embodiments, after submitting a request for approval, the installation software 115 may be configured to stall completion of installation for requested applications until an approval is received from the admin computer 130.

Figure 3:
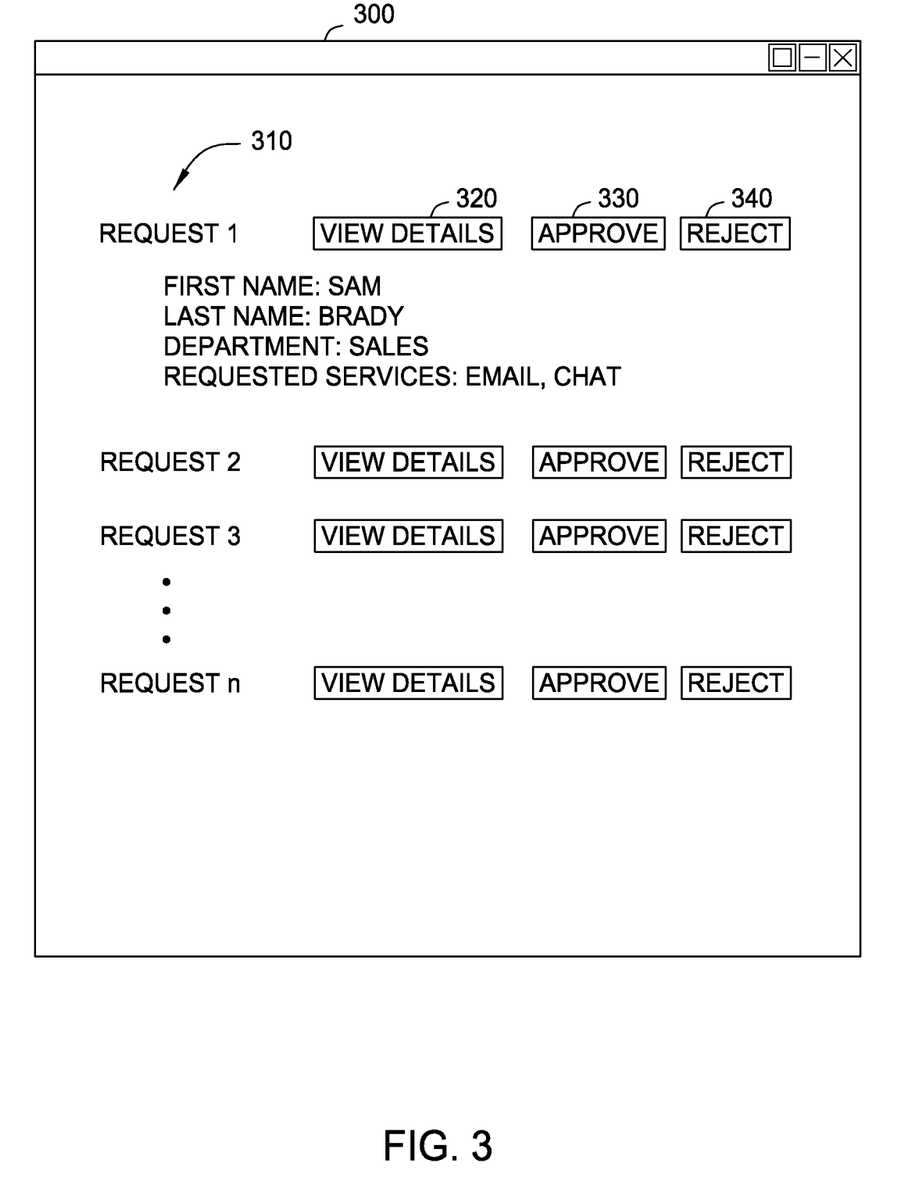

Multiple registration requests for approval from multiple client computers 110 may be stored at the admin computer 130, for example, in the memory 132 or storage 136 for approval by an administrator. In one embodiment of the invention, the application manager 135 may be configured to display a GUI screen at the admin computer 130 comprising a listing of approval registration requests received from various client computers 110. FIG. 3 illustrates an exemplary GUI screen 300 that may be generated by the application manager 135, according to an embodiment of the invention.

As illustrated in FIG. 3, the GUI screen 300 may include a listing 310 of registration requests received from the client computers 110.

In one embodiment of the invention, one or more graphical tools may be provided in the GUI 300 to facilitate inputs for each of the registration requests. For example, a view details button 320 is provided for each request in the listing 310. Clicking the view details button 320 may cause detailed information regarding the request, for example, the specific information provided by a user while requesting approval for use of an application, to be displayed in the GUI screen 300. As illustrated in FIG. 2, the details for request 1, include the user's first and last name, department, and requested applications, are illustrated in FIG. 3. While applications requested by a user are shown bundled together as a single request (request 1) in FIG. 2, in alternative embodiments, a separate request may be listed for each application desired by a user of a client computer 110.

While not shown in FIG. 3, in some embodiments, the details regarding client computers submitting the registration requests such as, for example, amount of available memory at the client computer, the operating system in use at the client computer, and the like may also be displayed in the GUI screen 300 along with user provided data.

In one embodiment, each request in the listing 310 may also have respective approve buttons 330 and reject buttons 340. Clicking an approve button 330 may cause an approval message to be sent to a client computer 110 from which the registration request was received. Upon receiving the approval message from the admin computer 130, the installation software installation software 115 may complete installation of an application 114, thereby allowing a user of the client computer 110 to execute the application 114.

On the other hand if the reject button is clicked in the GUI screen 300, a reject message is sent to the requesting client computer 110. Upon receiving the reject message, the installation software 115 may notify a user that an application 114 cannot be installed. In some embodiments, the reject message may include a reason for disapproval, for example, "not enough memory", "not authorized to use this product", or the like. Accordingly, the installation software 115 may display the reasons for disapproval to a user of the client computer 110.

In one embodiment of the invention, the actions taken by an administrator at the admin computer 130 to approve or reject registration of software applications by the users of client computers 110 may be stored as the approval history 134. In one embodiment, the application manager 135 may be configured to initiate auto-administration when a threshold amount of data is stored in the approval history 134.

For example, in one embodiment, upon storing a predefined number of responses to a first type of request, the application manager may determine that there is sufficient data to automatically approve or reject future first type registration requests received at the admin computer 130. For example, suppose the first type registration requests are registration requests from managers for an email client application. Upon storing a predefined number of responses entered by an administrator, for example, 100 responses, the application manager 135 may determine that there is sufficient stored history to predict whether future similar registration requests can be automatically approved or rejected.

In one embodiment of the invention, upon reaching a threshold amount of data for a given request type, the application manager 135 may be configured to prompt an administrator for input prior to enabling auto-administration. For example, in one embodiment, the application manager may display a GUI at the admin computer 130 requesting permission to enable auto-administration.

If auto administration is enabled, the application manager 135 may be configured to automatically approve or reject future registration requests (of the type for which auto-administration has been enabled), based on the approval history 134. For example, if the approval history shows that a majority of prior registration requests have been approved, the application manager may automatically approve all future registration requests. On the other hand, if the approval history shows that a majority of the prior registration requests have been rejected, the application manager 135 may automatically reject future registration requests.

In one embodiment of the invention, the application manager 135 may be configured to automatically approve future registration requests only if the prior history shows that a predefined percentage of the prior registration requests have been approved. For example, in one embodiment, the application manager 135 may approve future registration requests only if more than 90% of previous registration requests have been approved.

In some embodiments of the invention, the application manager 135 may be configured to automatically reject future registration requests only if the prior history shows that a predefined percentage of the prior registration requests have been approved. For example, in one embodiment, the application manager 135 may reject future registration requests only if less than 10% of previous registration requests have been rejected.

In the embodiments described above, if the approval history does not indicate that the approvals/rejections fall within the predefined thresholds, the application manager may not respond to the registration request. Instead, such registration requests may be stored as pending requests for action by an administrator.

In one embodiment of the invention, registration requests that are automatically approved or rejected by the application manager 135 may be displayed to an administrator, for example, the next time that an administrator uses the admin computer 130. For example, in one embodiment, the application manager 135 may be configured to display a GUI screen including a list of automatically approved/rejected registration requests.

Figure 4:
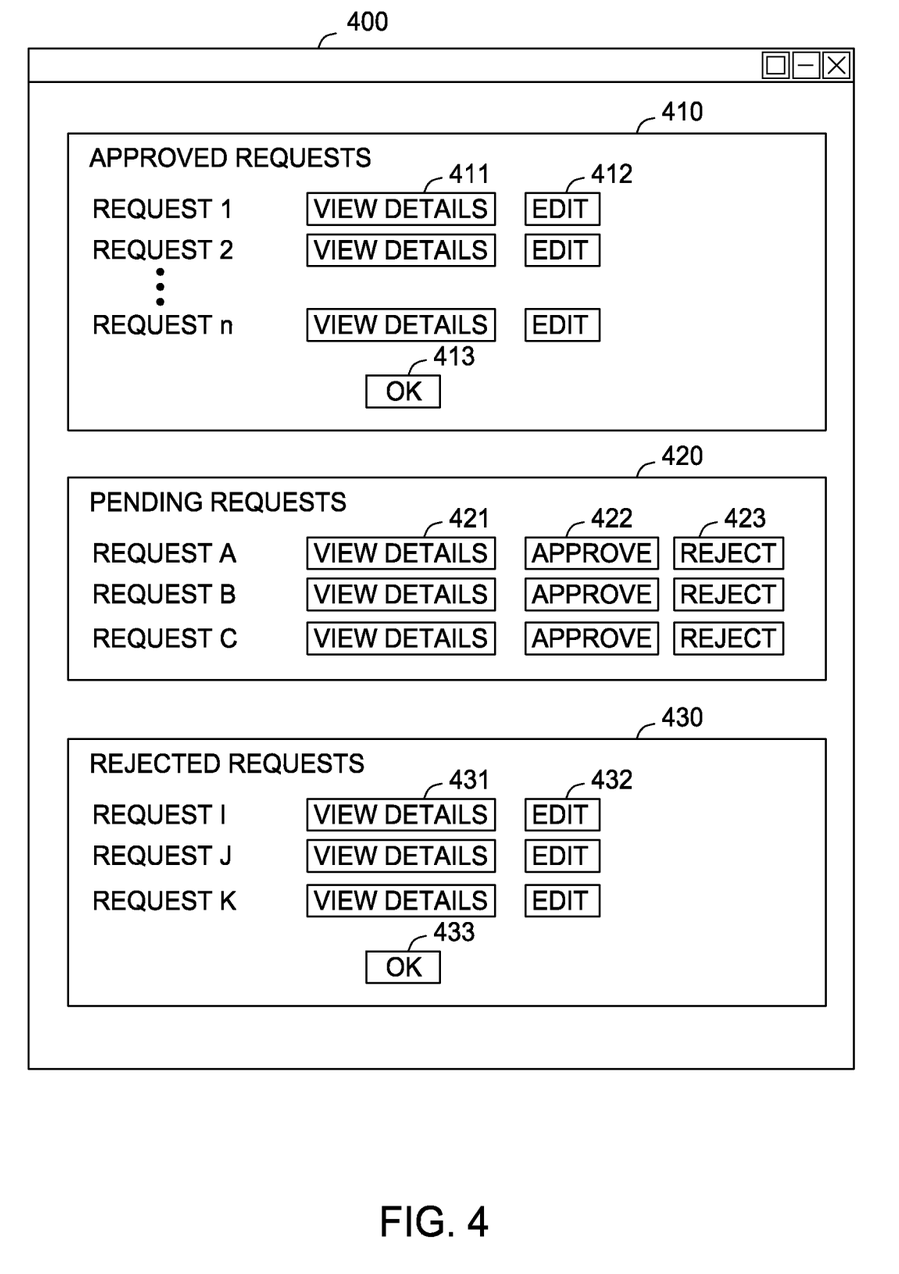

FIG. 4 illustrates an exemplary GUI screen 400 that may be displayed by the application manager according to an embodiment of the invention. As illustrated in FIG. 4, the GUI screen 400 may include a plurality of sections, for example, the sections 410, 420, and 430. Section 410 may include registration requests that were automatically approved by the application manager 135. For example, Requests 1-n are listed as automatically approved registration requests in FIG. 4. In one embodiment, a "View Details" button 411 may be provided for each request in the section 410 that may allow an administrator to view details associated with the request, for example, user provided data, system data, and the like.

An edit button 412 may also be provided for each request in the section 410, as illustrated in FIG. 4. Clicking the edit button may allow an administrator to change a status of the request. For example, clicking the edit button may generate another GUI to receive input that allows the administrator to reject the automatically approved request, put it in pending status, or the like. If an administrator edits an automatically approved registration request, the application manager 135 may be configured to send a message to a respective client computer 110. The message may be received by the installation software 115 at the client computer 110, which may disable use of the requested application at the client computer 110.

An "OK" button 413 is also provided. By clicking the "OK" button 413, an administrator may indicate that he/she approves the automated response generated by the application manager 135. Requests for which the OK button is pressed will not appear in the GUI screen 400, the next time it is generated by the application manager 135.

The GUI 400 may also include a pending requests section 420, as illustrated in FIG. 4. The section 420 may correspond to the GUI 300 of FIG. 3, and therefore may include registration requests that have not been automatically approved or rejected. As with the GUI 300, the section 420 may include a "View Details" button 421, "Approve Button" 422, and "Reject" button 423, which may function the same way as the "View Details" button 320, "Approve Button" 330, and "Reject" button 340 respectively, of FIG. 3.

The section 430 may include a list of registration requests that were automatically rejected by the application manager 135. Each of the registration requests i-k illustrated in FIG. 4 may have an associated "View Details" button 431 and an "Edit" Button 432. Clicking the "View Details" button 431 may display details associated with the request, for example, user provided data, system data, and the like.

Clicking the "Edit" button 432 may present one or more options for changing a status of the registration request. For example, in one embodiment, the application manager 135 may generate a GUI that may allow the administrator to alter a response to the registration request from "rejected" to "pending" or "approved". If the registration request is approved, a message is sent to a client computer 110 associated with the request indicating that installation of the requested application may now be completed and that the application can be used at the client computer 110. If the registration request is set to a pending status, then a message may be sent to the respective client computer 110 indicating that the registration is back under consideration for approval. An "OK" button 433 is also provided in section 430, which operates similar to the "OK" button 413 of section 410.

Figure 5:
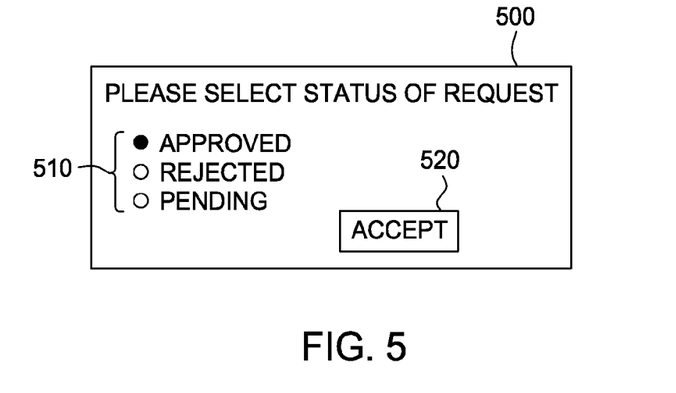

FIG. 5 illustrates an exemplary GUI screen 500 that may be displayed when an edit button, for example, the edit buttons 412 or 432 are clicked. As illustrated in 5, the GUI screen 500 may include a plurality of radio buttons 510, wherein each radio button is associated with an approval status of a registration request. In one embodiment, the radio button associated with a current status of the registration request may be selected by default. For example, in FIG. 5, the "Approved" radio button is selected by default indicating that the GUI screen 500 was displayed as a result of clicking an "Edit" button 412 in section 410 of FIG. 1.

An administrator may change the status of the registration request by selecting an alternative radio button 510 and clicking the accept button 520. In one embodiment of the invention, if the default radio button is selected when the accept button 520 is clicked, the status of the registration request is not changed.

In one embodiment of the invention, the automatic responses to the registration requests may be stored as a part of the approval history 134 illustrated in FIG. 1. Accordingly, the automatically administered responses from the application manager 135 may be considered while making decisions for future registration requests. In alternative embodiments, only administrator provided original responses and/or automatically generated responses that were edited by the administrator may be stored in the approval history 134. Therefore, the decisions on future requests may be made only on the basis of input provided by the administrator.

Figure 6:
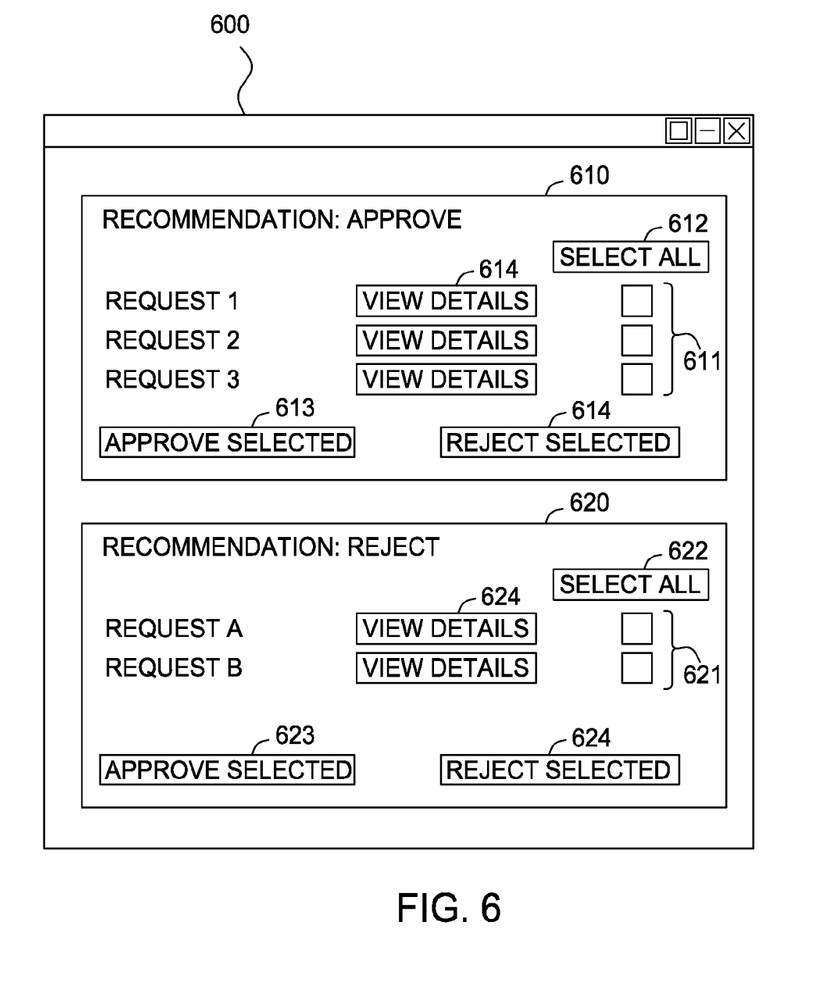

In one embodiment of the invention, instead of automatically approving or rejecting a received registration request, the application manager may be configured to determine a suggested action for each received request, and display the suggested actions in a GUI screen at the admin computer 130. FIG. 6 illustrates an exemplary GUI screen 600 that may be generated by the application manager 135 according to another embodiment of the invention. As illustrated in FIG. 6, the GUI 600 may include two sections 610 and 620. The section 610 may include registration requests (e.g. requests 1-3) that are recommended for approval based on the analysis of prior registration requests by the application manager 135.

As illustrated in FIG. 6, the section 610 may include a plurality of check boxes 611 for selecting specific registration requests. Also provided are an "Approve selected" button 613 and "Reject Selected" button 614 that either approve or reject all those requests for which an input has been provided using checkboxes 611. A "Select All" button 612 is provided to select all the check boxes 611 with one button click. A "View Details" button 614 is also shown for each request in the section 610, which performs the same function as the view details button 320 of FIG. 3.

Section 620 may include the registration requests that are recommended for rejection. The section 620 may be constructed similar to the section 610 and may include checkboxes 621 for selecting specific requests to perform an action. Also provided are an "Approve selected" button 623 and "Reject Selected" button 624 that either approve or reject requests for which an input has been provided using the checkboxes 621. A "Select All" button 622 is provided to select all the check boxes 621 with one button click. A "View Details" button 624 is also shown for each request in the section 620, which performs the same function as the view details button 320 of FIG. 3.

While the examples of request type and GUIs are provided hereinabove for illustrative purposes, embodiments of the invention are not limited to the specifically described embodiments. For example, any reasonable number of different types of requests may be predefined in the admin computer 130 to determine whether one or more received requests are similar to previously received requests. The request types may be defined by an administrator, or by the application manager 135. The request types may be based on any combination of one or more criteria including, for example, user roles, type of applications, type of client computer, time of request, version of application, and the like. Exemplary request types may include, for example, requests for an email client by a manager (referenced above), requests for a web browser, requests for an image editing software made between 2009 and 2010, and the like.

Furthermore, each request type may have its own respective criteria for determining whether registration requests should be approved or denied. For example, approval of registration requests for an email client may require that at least 70 percent of similar prior request types be approved in the approval history 134. On the other hand, approval of registration requests for a web browser may require at least 90 percent of prior request types be approved in the approval history 134

While percentages prior approved similar requests are disclosed as exemplary criteria for approving or rejecting future registration requests, in alternative embodiments, any reasonable criteria may be used. For example, in some embodiments, future registration requests may be approved if a threshold number of prior similar requests have been approved.

In some embodiments, the application manager may be configured to automatically approve registration requests if the registration requests have been in a pending status for a predefined period of time. For example, in one embodiment, requests for web browsers may be automatically approved if a given request has been in a pending status for more than a week. Such automatically approved pending requests may be displayed later to an administrator at the admin computer 130 using, for example, the GUI 400 of FIG. 4.

Referring back to FIGS. 4 and 6, while the GUIs 400 and 600 are shown comprising multiple sections, in alternative embodiments each section may be displayed as a separate GUI. Accordingly, in one embodiment, the GUIs may include graphical tools to facilitate navigation from one GUI to another until desired data is displayed.

Figure 7:
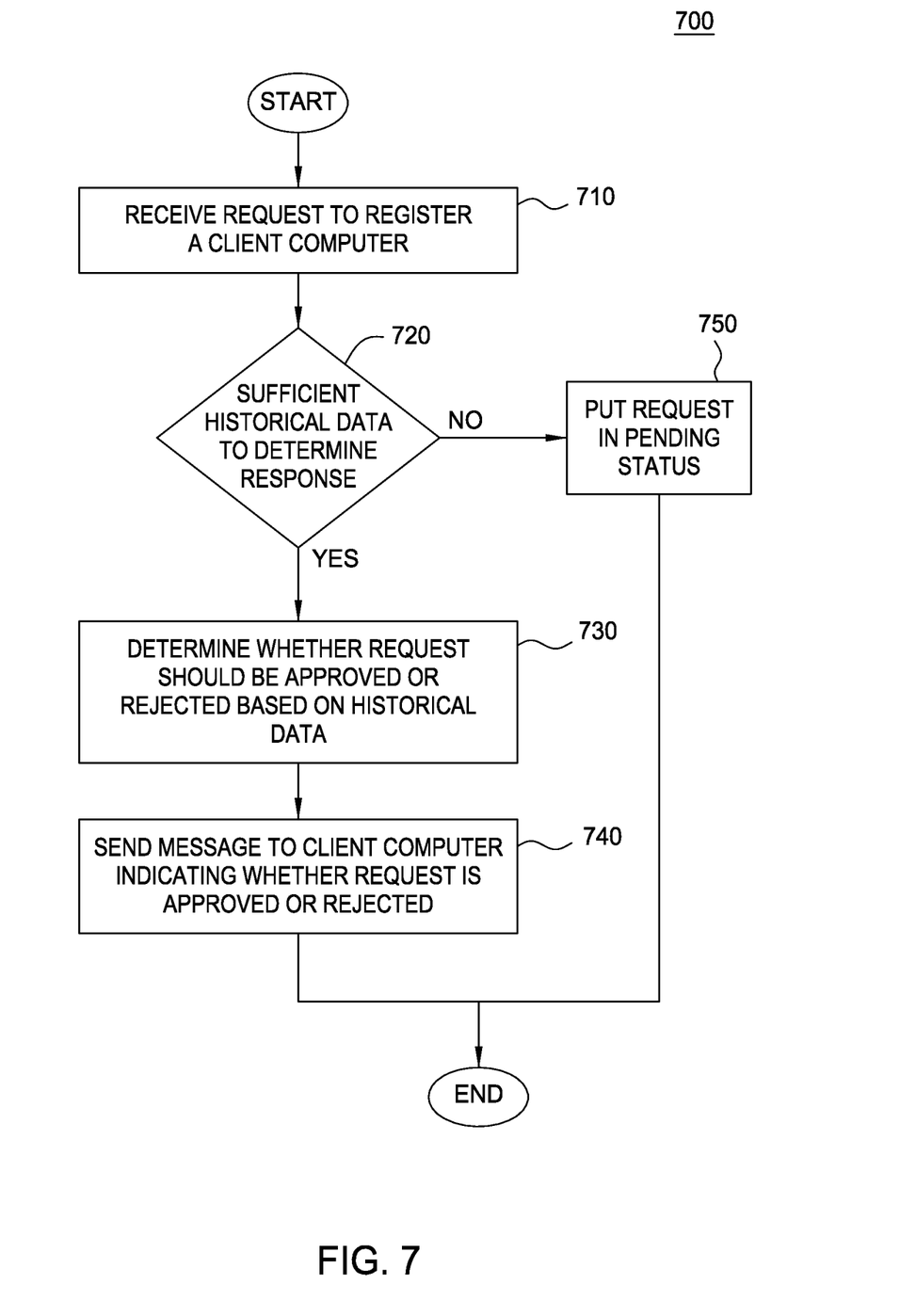
FIG. 7 is a flow diagram of exemplary operations that may be performed while registering an application, according to an embodiment of the invention.

FIG. 7 is a flow diagram of exemplary operations that may be performed by an application manager according to an embodiment of the invention. The operations may begin in step 710 by receiving a request to register an application from a client computer. In step 720, the application manager may determine whether there is sufficient historical data to determine whether the request should be approved or rejected. Upon determining that there is sufficient historical data, in step 730, the application manager may determine that whether the request should be rejected or approved based on the historical data. Then, in step 740, the application manager may send a message to the client computer indicating whether the request is approved or denied. However, if sufficient historical data is not present (step 720), then in step 750, the application manager may put the request in pending status for action by an administration.

By providing an application that is capable of learning from administrator actions while approving or rejecting application registration requests, embodiments of the invention facilitate automation of application registration management. Therefore, embodiments of the invention may be advantageously used for fast deployment of applications to multiple client computers in large organizations. Embodiments of the invention may also facilitate authorization of use of applications by client computers during periods of time when an administrator is unavailable due to for example, vacation, sick leave, etc.

While the foregoing is directed to embodiments of the present invention, other and further embodiments of the invention may be devised without departing from the basic scope thereof, and the scope thereof is determined by the claims that follow.

What is claimed is:

1. A computer-implemented method for registering applications residing on one or more client computers, the method comprising:
    receiving a request to register an application from a client computer;
    determining whether there is sufficient historical data comprising responses to previously received requests similar to the request to determine a response for the request;
    upon determining that there is sufficient historical data, determining, by operation of one or more computer processors, whether the request should be approved or rejected based on the historical data;
    upon determining that the request should be approved or rejected, responding to the client computer with a message indicating whether the request is approved or rejected;
    subsequent to responding to the client computer, generating a graphical user interface screen comprising a list of received requests to register one or more applications and an indication of a response generated for each of the received requests; and
    providing at least one graphical user interface tool to edit one or more of the generated responses.

2. The method of claim 1, further comprising upon determining that there is insufficient historical data, setting the request to a pending status for action by an administrator.

3. The method of claim 1, wherein determining whether the request should be approved or rejected based on the historical data comprises determining whether a threshold number of responses to previously received requests having a same request type as the request have been approved, and wherein determining whether the request should be approved or rejected is based solely on the threshold number.

4. The method of claim 3, wherein request type is based on user role and application type.

5. The method of claim 1, further comprising:
    determining whether a predefined period of time has passed since the request has been in a pending status for action by an administrator; and
    upon determining that the predefined period of time has passed, performing one of approving and rejecting the request.

6. The method of claim 1, further comprising:
    generating a graphical user interface screen comprising a list of received requests to register one or more applications and an indication of a suggested response for each of the received requests;
    providing at least one graphical user interface tool to one of accept and edit one or more of the suggested responses; and
    receiving a response indicating to one of accept and edit one or more of the suggested responses.

7. A non-transitory computer readable storage medium comprising a program product which, when executed, performs an operation for registering applications residing on one or more client computers, the operation comprising:
    receiving a request to register an application from a client computer;
    determining whether there is sufficient historical data comprising responses to previously received requests similar to the request to determine a response for the request;
    upon determining that there is sufficient historical data, determining, by operation of one or more computer processors, whether the request should be approved or rejected based on the historical data;
    upon determining that the request should be approved or rejected, responding to the client computer with a message indicating whether the request is approved or rejected;
    subsequent to responding to the client computer, generating a graphical user interface screen comprising a list of received requests to register one or more applications and an indication of a response generated for each of the received requests; and
    providing at least one graphical user interface tool to edit one or more of the generated responses.

8. The computer readable storage medium of claim 7, wherein the operation further comprises:
    upon determining that there is insufficient historical data, setting the request to a pending status for action by an administrator.

9. The computer readable storage medium of claim 7, wherein determining whether the request should be approved or rejected based on the historical data comprises determining whether a threshold number of responses to previously received requests having a same request type as the request have been approved, and wherein determining whether the request should be approved or rejected is based solely on the threshold number.

10. The computer readable storage medium of claim 9, wherein request type is based on user role and application type.

11. The computer readable storage medium of claim 7, wherein the operation further comprises:
   determining whether a predefined period of time has passed since the request has been in a pending status for action by an administrator; and
   upon determining that the predefined period of time has passed, performing one of approving and rejecting the request.

12. The computer readable storage medium of claim 7, wherein the operation further comprises:
   generating a graphical user interface screen comprising a list of received requests to register one or more applications and an indication of a suggested response for each of the received requests;
   providing at least one graphical user interface tool to one of accept and edit one or more of the suggested responses; and
   receiving a response indicating to one of accept and edit one or more of the suggested responses.

13. A system comprising:
   a plurality of client computers, wherein each client computer is configured to generate a request to register one or more applications; and
   at least one administrator computer comprising:
      a memory comprising a program; and
      a processor which, when executing the program, is configured to:
         receive a request to register an application from at least one client computer;
         determine whether there is sufficient historical data comprising responses to previously received requests similar to the request to determine a response for the request;
         upon determining that there is sufficient historical data, determine whether the request should be approved or rejected based on the historical data;
         upon determining that the request should be approved or rejected, respond to the client computer with a message indicating whether the request is approved or rejected;
         subsequent to responding to the client computer, generate a graphical user interface screen comprising a list of received requests to register one or more applications and an indication of a response generated for each of the received requests; and
         provide at least one graphical user interface tool to edit one or more of the generated responses.

14. The system of claim 13, wherein the processor is further configured to set the request to a pending status for action by an administrator upon determining that there is insufficient historical data.

15. The system of claim 13, wherein determining whether the request should be approved based on the historical data comprises determining whether a threshold number of responses to previously received requests having a same request type as the request have been approved, and wherein determining whether the request should be approved or rejected is based solely on the threshold number.

16. The system of claim 15, wherein request type is based on user role and application type.

17. The system of claim 13, the processor is further configured to:
   determine whether a predefined period of time has passed since the request has been in a pending status for action by an administrator; and
   upon determining that the predefined period of time has passed, perform one of approve and reject the request.

18. The system of claim 13, wherein the processor is further configured to:
   generate a graphical user interface screen comprising a list of received requests to register one or more applications and an indication of a suggested response for each of the received requests;
   provide at least one graphical user interface tool to one of accept and edit one or more of the suggested responses; and
   receive a response indicating to one of accept and edit one or more of the suggested responses.

* * * * *